United States Patent [19]

Johnson et al.

[11] Patent Number: 4,743,097

[45] Date of Patent: May 10, 1988

[54] INCOHERENT IMAGE INTENSITY NORMALIZATION, CONTOUR ENHANCEMENT, AND PATTERN RECOGNITION SYSTEM

[75] Inventors: John L. Johnson; Don A. Gregory; James C. Kirsch, all of Huntsville, Ala.

[73] Assignee: The United States of America as represented by the Secretary of the Army, Washington, D.C.

[21] Appl. No.: 34,356

[22] Filed: Apr. 6, 1987

[51] Int. Cl.[4] .......................... G02F 1/13; G02B 27/46

[52] U.S. Cl. ................................ 350/337; 350/331 R; 350/342; 350/162.12

[58] Field of Search ........... 350/337, 342, 174, 162.12, 350/162.13; 358/236, 240, 250; 353/30, 31; 364/822

[56] References Cited

U.S. PATENT DOCUMENTS

| | | | |
|---|---|---|---|
| 3,744,879 | 7/1973 | Beard et al. | 350/162.12 |
| 3,798,452 | 3/1974 | Spitz et al. | 350/342 |
| 3,824,002 | 7/1974 | Beard | 350/342 |
| 4,018,509 | 4/1977 | Boswell et al. | 350/342 |
| 4,124,278 | 11/1987 | Grinberg et al. | 350/342 |
| 4,647,154 | 3/1987 | Birnbach et al. | 364/822 |
| 4,707,077 | 11/1987 | Marom | 350/162.12 |

OTHER PUBLICATIONS

D. Gregory-"Acoustooptically Made and Addressed Fourier Transform Matched Filters" pp. 331-333-Applied Optics-vol. 25, No. 3, Feb. 1986.

W. P. Bleha-"Application of the LCLV to Real-Time Optical Data Processing" pp. 371-384-Optical Engineering-vol. 17, No. 4-1978.

D. G. Nichol-"Edge Enhancement for Autocorrelation and Chord Function Processing" pp. 242-246-Optics Communciations-Dec. 1983.

R. Lewis-"Real Time Coherent Optical Edge Enhancement" pp. 161-162-Applied Optics-vol. 17, No. 2-Jan. 1978.

*Primary Examiner*—Stanley D. Miller
*Assistant Examiner*—Tai V. Duong
*Attorney, Agent, or Firm*—Freddie M. Bush; Robert C. Sims

[57] ABSTRACT

Incoherent optical processing techniques are shown which demonstrate image intensity normalization and contour enhancement. A new type of incoherent optical correlator which combines a model of the human neural system with an intensity image convolver. The processor's principal element is a Hughes liquid crystal light valve (LCLV). All components are commercially available and used without modification except for a liquid crystal television (LCLV). In operation the invention can be used as either a pre-processor to intensity normalize and edge enhance video scenes for use in pattern recognition applications or as a real-time pattern recognition device within itself, with the addition of an LCTV.

8 Claims, 1 Drawing Sheet

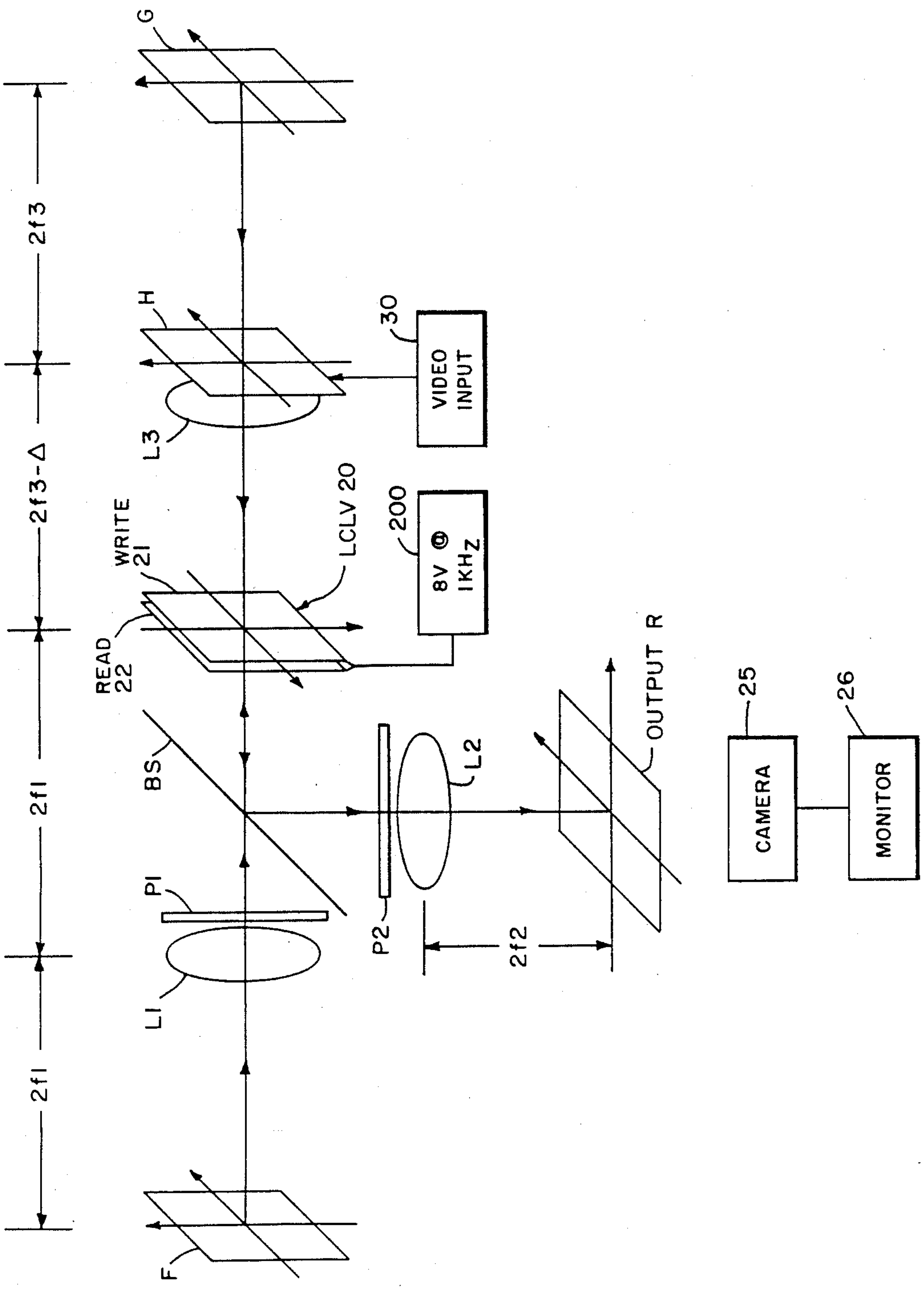
G
2f3
H
30
VIDEO INPUT
L3
2f3-Δ
WRITE
21
LCLV 20
200
8V @ 1KHz
READ
22
OUTPUT R
BS
25
CAMERA
26
MONITOR
L2
2f1
PI
P2
2f2
LI
2f1
F

INCOHERENT IMAGE INTENSITY NORMALIZATION, CONTOUR ENHANCEMENT, AND PATTERN RECOGNITION SYSTEM

DEDICATORY CLAUSE

The invention described herein may be manufactured, used, and licensed by or for the Government for governmental purposes without the payment to us of any royalties thereon.

BACKGROUND OF THE INVENTION

Incoherent optical processing techniques have been discovered which demonstrate image intensity normalization and contour enhancement. These findings have led to the formulation of a new type of incoherent optical correlator which combines a model of the human neural system with an intensity image convolver. The processor's principal element is a Hughes liquid crystal light valve (LCLV). All components are commercially available and used without modification except for a liquid crystal television (LCTV). (see D. Gregory, Appl. Opt., February 1986) In operation the invention can be used as either a pre-processor to intensity normalize and edge enhance video scenes for use in pattern recognition applications or perhaps as a real-time pattern recognition device within itself, with the addition of an LCTV.

SUMMARY OF THE INVENTION

The basic arrangement is given in the FIGURE. The system in general has three input images F, G, and H, and an output intensity image detected at R. The images F and G are identical displays of the same scene and are created by any of the well known optical systems such as a television. H depicts a variable stop when the system is used to perform image intensity normalization and edge enhancement. In the correlation mode of operation, H also represents a transparency of a reference scene (memory) or a modified liquid crystal television (LCTV, discussed later) which displays the reference scene.

BRIEF DESCRIPTION OF THE DRAWING

The single FIGURE illustrates the principal of the invention.

DETAILED DESCRIPTION OF THE PREFERRED EMBODIMENTS

The intensity normalization aspect of system shown in the FIGURE is described as follows. Suppose the illuminating intensity (sunlight or artifical lighting) varies in the input scene. This generally produces an image with absolute contrasts corresponding to the absolute illumination. The invention described here takes advantage of an inhibition mode of the Hughes liquid crystal light valve 20 (LCLV) with the result that each point in the processed image will approach a final intensity level proportional to the relative intensity at that point in the scene rather than the absolute intensity at that point. Many digital image processing routines require that the image first be intensity normalized. This is a lengthy, time consuming operation when done digitally. The system described in this disclosure performs image intensity normalization in near real time, limited by the speed of the LCLV.

A second operation usually performed while digitally (or optically) processing an image is that of edge enhancement. There are several standard digital techniques for performing this operation. The system described here performs this time consuming calculation optically in near real time. In almost any pattern recognition system, the edges which define an image are the most important parameters. Often these edges are not sharp due to atmospheric abberations low spacial frequency scene elements, or poor optical elements. The invention described here improves the relative edge contrast of a scene, thereby making the edges more prominent, which in turn makes the scene easier to further process using digital or optical techniques.

Lastly, the design of a new type of incoherent correlator is shown. The contrast-inverted reference image is displayed at H on a suitable transparency or a LCTV. The intensity on the "write" side 21 of the LCLV 20 becomes a convolution of the LCTV reference image H and the defocused image G (which is identical to F). If G (and F) are identical to the reference image, the intensity on the "write" side 21 becomes a broad maximum with a depression in the center (an annular distribution). The LCLV 20 is operated in its inhibition mode. This low broad distribution will be centered on all the target images matching the reference. As the system intensity normalizes and edge enhances, the targets will suppress the surrounding regions while at the same time they themselves are relatively enhanced and sharpened.

The system is arranged so that the inhibiting convolution can occur anywhere on the entire active region of the LCLV, therefore it can continue to enhance a target undergoing a non-rotating lateral translation in the scene and thus will track a moving target. The correlation (recognition) may be observed at the output plane R, either directly or with the aid of a television camera 25 and monitor 26.

OPERATION OF THE INVENTION

In operation, the incoherent television image F is imaged by a lens L1 through a plane polarizer P1 onto the "read" side 22 of the LCLV 20. The resultant image reflected from the LCLV is directed using a standard beamsplitter BS, through plane polarizer P2 and imaged by lens L2 onto the output plane. This image is the processor output R. The "write" side 21 of the LCLV is illuminated using another television image, G. This incoherent image passes through the mask H (which may be a simple stop with a central obscuration or a transmittance image provided by an LCTV) located at the aperature of lens L3 and is re-imaged near, but not exactly on, the "write" side of the LCLV. This image is deliberately defocused by an amount Δ, shown in the FIGURE. The polarizer P2 is set parallel to P1. This is 90 degrees from the usual crossed polarizer setting. Normally an intense "write" light results in an intense "read" light. This is not true when P1 is parallel to P2. An intense "write" light will now inhibit the reflectivity of the "read" side of the LCLV. The complete operation of an LCLV is described in detail in J. Grimberg, et al, Opt. Engr. 14:217, (1975). The LCLV is powered by an 8 volt, 1 KHz sine or rectangular wave source 200.

If the mask H is a simple stop with a central opaque spot, the invention functions as an intensity normalizing and edge enhancing pre-processor. The proposed correlation function of the system would require that the contrast-inverted reference (memory) image be displayed at the location of H in FIG. 1. This may be accomplished using a transparency of the reference image or by using an LCTV modified for the purpose. Essentially the modification would involve removing the factory attached polarizers and holding the display screen vertical with fabricated supports. This has successfully been done for a different application. Test scenes can then be applied by a video input device 30 to the correlator by displaying them simultaneously as the same television image at F and G. If the test scene matches the reference scene, a correlation enhancement will be detected at plane R. This may be detected visually or with a television camera 25.

RESULTS

The invention has been used to demonstrate image intensity normalization and edge enhancement. A first photograph was taken from television monitor 26 which was displaying the output from a television camera and lens combination placed at the output plane R. The "writing" intensity from the image at G was blocked, thus the reflected image F was not inhibited (normalized). The LCLV responded with a uniform high reflectivity. The "writing" light was then unblocked and a 2 cm opaque central spot stop placed in front of the 5 cm diameter lens L3. The reflectivity of the LCLV was then inhibited and the resulting intensity normalized image is shown by a second photograph.

A demonstration of edge enhancement has been done using two circular spots as an input scene F. One spot was more reflective (and thus appeared brighter) than the other. A photograph of the input scene was taken. The contrast difference was obvious. A measurement of this difference was obtained using a Colorado Video image digitizer. The contrast ratio (the maximum intensity divided by the minimum) was obtained by determining the average intensity of the bright spot and of the darker spot. The contrast ratio was about 2.5. This ratio was measured again after the image of the two spots was processed by the invention described here. The results show the contrast ratio was about 5.0; a significant improvement. The improvement is due to the fact that the system allows each spot to inhibit the other, and the brighter spot thus further suppresses the dimmer spot more than it itself is suppressed. This competitive dominance effect increases the ratio of the intensities of the two spots. This occurs for all nearby pairs in an image, resulting in an overall contrast enhancement.

We claim:

1. A system comprising a liquid crystal light valve having a read side and a write side, a first image, first and second plane polarizers, first means for transmitting said first image through said first polarizer to the read side in focus for reflection from said read side through said second polarizer, a second image, second means transmitting said second image to the write side out of focus, and detecting means for receiving the reflection after passing through said second polarizer.

2. A system as set forth in claim 1, wherein said first and second polarizers have their polarization aligned parallel to each other.

3. A system as set forth in claim 2, further including a beamsplitter arranged to pass the image from said first means on to said read side and reflect the reflection on to said second polarizer and said detecting means.

4. A system as set forth in claim 2 further comprising a mask with a central opaque spot located between said second means and said second image.

5. A system as set forth in claim 4 wherein said first and said second images are identical.

6. A system as set forth in claim 2 wherein said first and said second images are identical.

7. A system as set forth in claim 6 further comprising a transparency having a reference image thereon, said transparency being located between said second means and said second image for comparing said second image with said reference image.

8. A system as set forth in claim 6 further comprising a liquid crystal TV having the reference image on its screen, and said screen being located between said second means and said second image for comparing said second image with said reference image.

* * * * *